US008605869B1

(12) United States Patent
Mobarak et al.

(10) Patent No.: US 8,605,869 B1
(45) Date of Patent: Dec. 10, 2013

(54) METHOD AND APPARATUS FOR FORCING A CALL TO A CARRIER PROVIDED VOICE MAIL FACILITY

(75) Inventors: Toufic Boutros Mobarak, Newton, MA (US); Ashou Han, Winchester, MA (US)

(73) Assignee: Mobilesphere, Ltd., Boston, MA (US)

( * ) Notice: Subject to any disclaimer, the term of this patent is extended or adjusted under 35 U.S.C. 154(b) by 1153 days.

(21) Appl. No.: 12/188,821

(22) Filed: Aug. 8, 2008

(51) Int. Cl.
*H04M 11/00* (2006.01)
*H04L 12/16* (2006.01)
*G06F 12/00* (2006.01)

(52) U.S. Cl.
USPC ........ 379/88.17; 370/260; 370/324; 370/335; 370/338; 370/352; 379/88.04; 379/88.19; 379/133; 379/217.01; 379/221.02; 382/115; 455/67.11; 455/412.2; 455/427; 455/450; 455/519; 711/161; 713/170; 713/182; 726/13

(58) Field of Classification Search
USPC .......... 379/88.04, 88.13, 88.14, 88.17, 88.19, 379/217.01, 221.01, 221.02, 67.1, 133; 382/115; 455/67.11, 412.2, 418, 433, 455/519, 450, 427; 713/170, 182; 726/13; 370/260, 335, 324, 338, 352; 707/999.01; 711/161
See application file for complete search history.

(56) References Cited

U.S. PATENT DOCUMENTS

| | | | | |
|---|---|---|---|---|
| RE28,577 | E * | 10/1975 | Schmidt | 370/324 |
| 5,509,055 | A * | 4/1996 | Ehrlich et al. | 379/133 |
| 5,933,488 | A * | 8/1999 | Marcus et al. | 379/217.01 |
| 6,061,432 | A * | 5/2000 | Wallace et al. | 379/88.18 |
| 6,215,857 | B1 * | 4/2001 | Kasiviswanathan | 379/67.1 |
| 6,330,308 | B1 * | 12/2001 | Cheston et al. | 379/88.04 |
| 6,473,414 | B1 * | 10/2002 | Hartley et al. | 370/338 |
| 6,529,731 | B2 * | 3/2003 | Modzelesky et al. | 455/427 |
| 6,748,068 | B1 | 6/2004 | Walsh et al. | |
| 6,801,615 | B2 * | 10/2004 | Stumer et al. | 379/221.02 |
| 6,810,114 | B2 * | 10/2004 | Welfley | 379/88.18 |
| 6,983,370 | B2 * | 1/2006 | Eaton et al. | 713/182 |
| 7,031,438 | B1 * | 4/2006 | Cheston et al. | 379/88.14 |
| 7,228,145 | B2 * | 6/2007 | Burritt et al. | 455/519 |
| 7,245,713 | B1 * | 7/2007 | Simpson et al. | 379/221.01 |
| 7,382,752 | B2 * | 6/2008 | Melhuish | 370/335 |
| 7,412,232 | B2 * | 8/2008 | Wilson et al. | 455/418 |

(Continued)

*Primary Examiner* — Gerald Gauthier
(74) *Attorney, Agent, or Firm* — Burns & Levinson LLP; Bruce D. Jobse, Esq.

(57) ABSTRACT

Disclosed are systems and techniques by which a caller may specify a callee's telephone number and be connected directly to a carrier provided voice mail facility associated with the identified the telephone number, even though the callee's carrier may not be the same as the caller's carrier. In the disclosed technique, a telephony server places a "Send a call" request to a server which then sends a signaling call that busies out the channel associated with the callee. The telephony server places a second call (the actual voice message) upon confirmation that the signaling call has been initiated, forcing the second call to the carrier's voice mail facility associated with the callee, since the first signaling call busied the first channel. Prior to sending the signaling call, a database look up is performed to determine which carrier services the callee number. Once the carrier is determined, another memory look up is performed to determine the time delay associated with that carrier. The time delay is then counted upon initiation of the first signaling call and the signaling call terminated upon expiration of the delay period. A user interface is provided by which a caller may specify the number of the intended callee by either a web interface, an external telephony interface such as an Interactive Voice Response (IVR) facility, an interface mechanism internal to a caller's private telephony network, or an automated number capture mechanism.

35 Claims, 7 Drawing Sheets

(56) References Cited

U.S. PATENT DOCUMENTS

| | | | |
|---|---|---|---|
| 7,437,155 B2* | 10/2008 | Levitan | 455/433 |
| 7,484,056 B2* | 1/2009 | Madnani et al. | 711/161 |
| 7,529,200 B2* | 5/2009 | Schmidt et al. | 370/260 |
| 7,532,877 B2* | 5/2009 | Lee et al. | 455/412.2 |
| 7,536,718 B2* | 5/2009 | Wilson et al. | 726/13 |
| 7,805,475 B2* | 9/2010 | Kamei et al. | 707/999.001 |
| 8,451,825 B2* | 5/2013 | Altberg et al. | 370/352 |
| 2003/0101343 A1* | 5/2003 | Eaton et al. | 713/170 |
| 2004/0229626 A1* | 11/2004 | Yi et al. | 455/450 |
| 2004/0264656 A1 | 12/2004 | Walsh et al. | |
| 2005/0025295 A1* | 2/2005 | Christie | 379/88.19 |
| 2005/0260974 A1* | 11/2005 | Lee et al. | 455/412.2 |
| 2006/0072791 A1* | 4/2006 | Gutta et al. | 382/115 |
| 2006/0276139 A1* | 12/2006 | Pummill et al. | 455/67.11 |
| 2007/0274465 A1* | 11/2007 | Othmer | 379/67.1 |
| 2008/0215594 A1* | 9/2008 | Kamei et al. | 707/10 |
| 2010/0329434 A1* | 12/2010 | Othmer et al. | 379/88.13 |

* cited by examiner

| CALLER ID | CALLEE NUMBER | CALLER NUMBER | TIME STAMP |
|---|---|---|---|
| ... | ... | ... | ... |

Figure 6B

METHOD AND APPARATUS FOR FORCING A CALL TO A CARRIER PROVIDED VOICE MAIL FACILITY

FIELD OF THE INVENTION

This disclosure relates generally to the field of telephony, more specifically, to a method and system for forcing a telephone call to a carrier provided voice mail facility associated with the callee.

BACKGROUND OF THE INVENTION

The advent of voice machines connectable to traditional telephony equipment, and, more recently, voicemail services offered by a telephone carrier, have created the ability for asynchronous voice. The ability to communicate asynchronously using voice data provides a viable option to real-time or synchronous, particularly when a callee is difficult to reach. In addition, it is not always desirable to establish voice communication directly with the callee. For example, a caller may desire to leave a voice message with a particular callee, however, establishing a call at that particular instance may not be appropriate because of different time zones, business etiquette, or other reasons to avoid a direct real-time communication with the callee.

Select telephony carriers offer voicemail facilities to their respective subscribers. Some of these voicemail facilities offer the callee the functionality of, while reviewing messages in the callee voicemail box, sending a responsive voicemail to the voice mailbox of the caller. Such communications are implemented from one voicemail box to another, within the inter-carrier network, without actually initiating any communication connection over a PSTN or VOIP network between the parties. Also, such responses are usually limited to parties who subscribe to the same carrier, that is, a callee cannot leave a responsive voicemail through his or her voice mail facility for a caller who's call originated from another carrier's network.

Even with the advent of Voice Over Internet Protocol (VOIP) technology, it is not usually possible to be connected directly to a voice mail facility associated with a particular communication line, without first attempting to establish a real-time voice data call and without the callee being notified of the incoming call. In most instances, a caller does not have the option of being connected directly to a callee's voicemail box or service, especially between different carriers.

Accordingly, a need exists for the ability to establish a connection directly to the voicemail associated with a callee without the callee being notified of the incoming call or without the callee being able to answer the incoming call.

Accordingly, another need exists for the ability to establish a connection directly to the voicemail associated with a callee in a manner that is more efficient than any prior attempted solutions.

A further need exists for the ability to establish a connection directly to the voicemail functionality provided by a telephone carrier that is different from the caller's telephone carrier.

Furthermore, a need exists for ability to establish a connection directly to a callee's voicemail facility that is not carrier sensitive.

BRIEF DESCRIPTION OF THE DRAWINGS

The above and other features, objects and advantages of the disclosure will be better understood by referring to the following detailed description in conjunction with the accompanying drawing in which.

SUMMARY OF THE INVENTION

Disclosed are systems and techniques by which a caller may specify a callee's telephone number and be connected directly to a carrier provided voice mail facility associated with the identified the telephone number, even though the callee's carrier may not be the same as the caller's carrier. In the disclosed technique, a telephony server places a "Send a call" request to a server which then sends a signaling call that busies out the call destination channel associated with the callee. The telephony server places a second call (the actual voice message) after upon confirmation that the signaling call has initiated with the call destination channel, forcing the second call to the carrier's voice mail facility associated with the callee, since the first signaling call busied the first channel. Prior to sending the signaling call, a database look up is performed to determine which carrier services the callee number. Once the carrier is determined, another memory look up is performed to determine the time delay associated with that carrier. The time delay is then counted from the time of initiation of the signaling call and the signaling call terminated upon expiration of the time delay period. In this manner, the first signaling call cannot be answered by the callee, as the callee is not aware of the signaling calls presence since the duration of the call was not long enough to alert the callee. A user interface may be provided by which a caller may specify the number of the intended callee by either a publically accessible web interface or telephony interface, such as an Interactive Voice Response (IVR) facility, an interface mechanism internal to a caller's private telephony network, or an automated number capture mechanism.

In a second disclosed technique the telephony server places two almost simultaneous calls. The two calls are separated by the period of time necessary for telephony server to confirm that the first call has been established with the call destination channel. Once such confirmation is received the telephony server initiates a second call to the call destination channel. Simultaneously, the first call is terminated after a predetermined time delay which is carrier specific and which may be tracked using a software timer. The first call busies out the call destination channel associated with the callee. The second call (the actual voice message) forces the second call to the carrier's voice mail facility associated with the callee, since the first call busies the first channel.

According to a first aspect, a method for communicating directly with a carrier provided voicemail facility associated with a call destination channel comprises: A) initiating a first communication connection with the call destination channel; B) initiating a second communication connection to the call destination channel; and C) terminating the first communication connection within a predetermined time period following initiation of the first communication connection.

According to a second aspect, a method for forcing a communication connection with a carrier provided voicemail facility associated with a call destination channel comprises: (a) busying the destination the call channel without alerting the callee; and (b) establishing a voice connection with the carrier provided voicemail facility associated with the call destination channel.

According to a third aspect, a computer program product for use with a computer system operatively coupled to a communication network comprises a computer readable medium having program code embodied thereon comprising: (a) program code for initiating a first communication connection with a call destination channel; B) program code for initiating a second communication connection to the call destination channel; and C) program code for terminating the first communication connection within a predetermined time period following initiation of the first communication connection.

According to a fourth aspect, a computer program product for use with a computer system operatively coupled to a communication network comprises a computer readable medium having program code embodied thereon comprising: (a) program code for busying a destination call channel without alerting the callee; and (b) program code for establishing a voice communication connection with a carrier provided voicemail facility associated with the call destination channel.

According to a fifth aspect, an apparatus for use with a communications network comprises: (a) a processor; (b) a memory coupled to the processor for maintaining a plurality of carrier identifiers, selected of the carrier identifiers having associated therewith at least one predetermined time delay value; (c) a network interface, coupled to the processor and the memory; (d) program logic for initiating first and second communication connections to a call destination channel; and (e) program logic for terminating the first communication connection after a predetermined delay value associated with one of the carrier identifiers.

According to a sixth aspect, a method for communicating directly with a carrier provided voicemail facility associated with a call destination channel comprises: (a) maintaining in a memory a plurality of carrier identifiers, selected of the carrier identifiers having associated therewith at least one predetermined time delay value; (b) initiating first and second communication connections with the call destination channel; and (c) terminating the first communication connection after expiration of a predetermined time delay value associated with one of the carrier identifiers.

DETAILED DESCRIPTION OF SPECIFIC EMBODIMENTS

Figure 1:
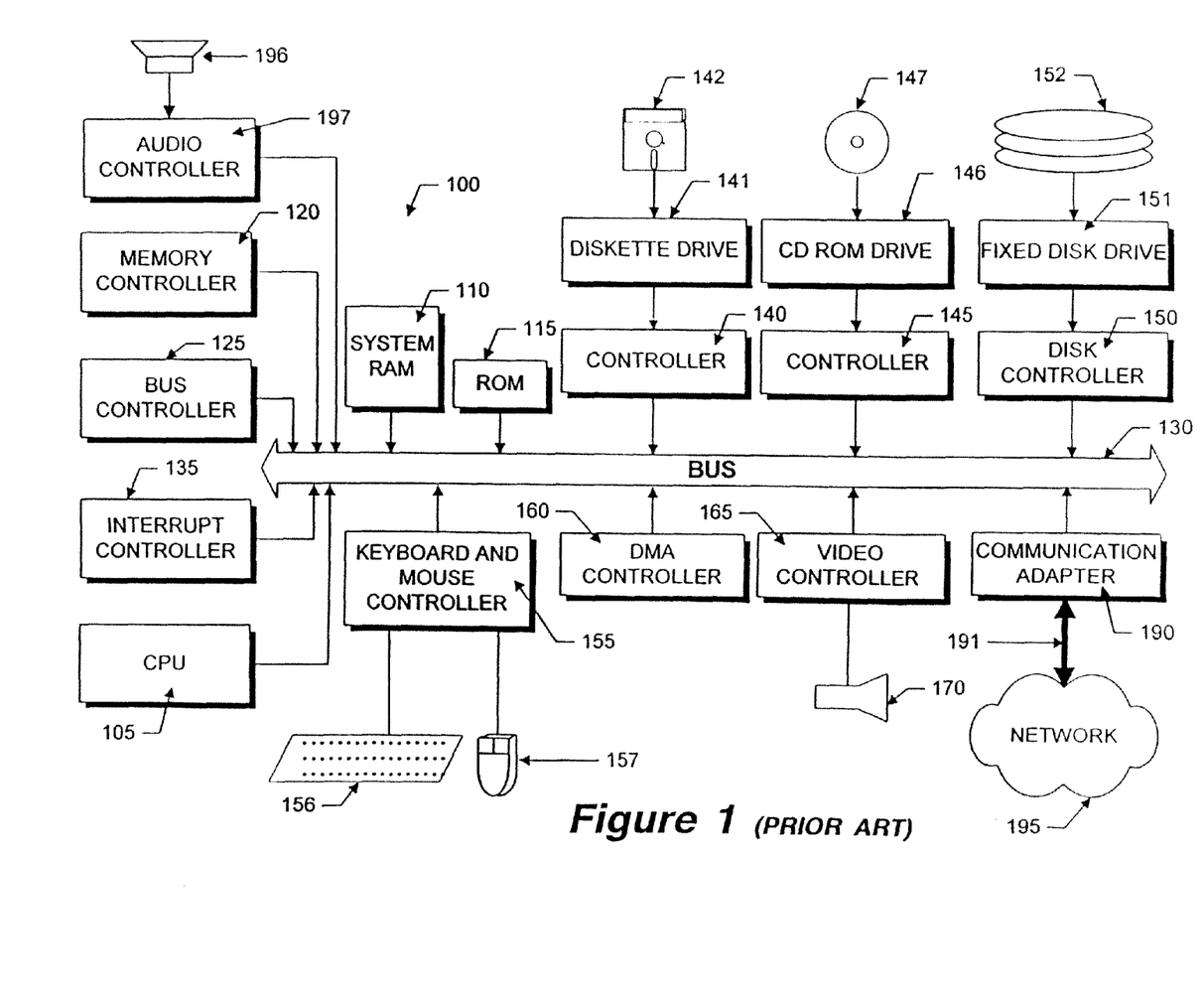
FIG. 1 is a block diagram of a prior art computer system suitable for use with the disclosed system.

FIG. 1 illustrates the system architecture for a computer system 100 with which the various computing elements of the disclosed system may be implemented. The exemplary computer system of FIG. 1 is for descriptive purposes only. Although the description may refer to terms commonly used in describing particular computer systems, such as a Personal Computer or other microprocessor base computer architectures, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components. Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by commercially available operating system software, such as Windows NT, Unix or Linux that are available from many software companies or organizations. The operating system controls allocation of system resources and performs tasks such as processing scheduling, memory management, networking, and I/O services, among things. In particular, an operating system resident in system memory and running on CPU 105 coordinates the operation of the other elements of computer system 100. The disclosed system may also be implemented with other commercially available operating systems including, Armonk, N.Y.; Windows 95 commercially available from Microsoft Corporation, Redmond, Wash.; Linux, commercially available from Red Hat Software, Research Triangle Park, N.C. or other Linux vendors; Unix, commercially available from SCO Salt Lake City Utah and Solaris, commercially available from Sun Microsystems, Palo Alto, Calif.

Telecommunication Environment

Figure 2:
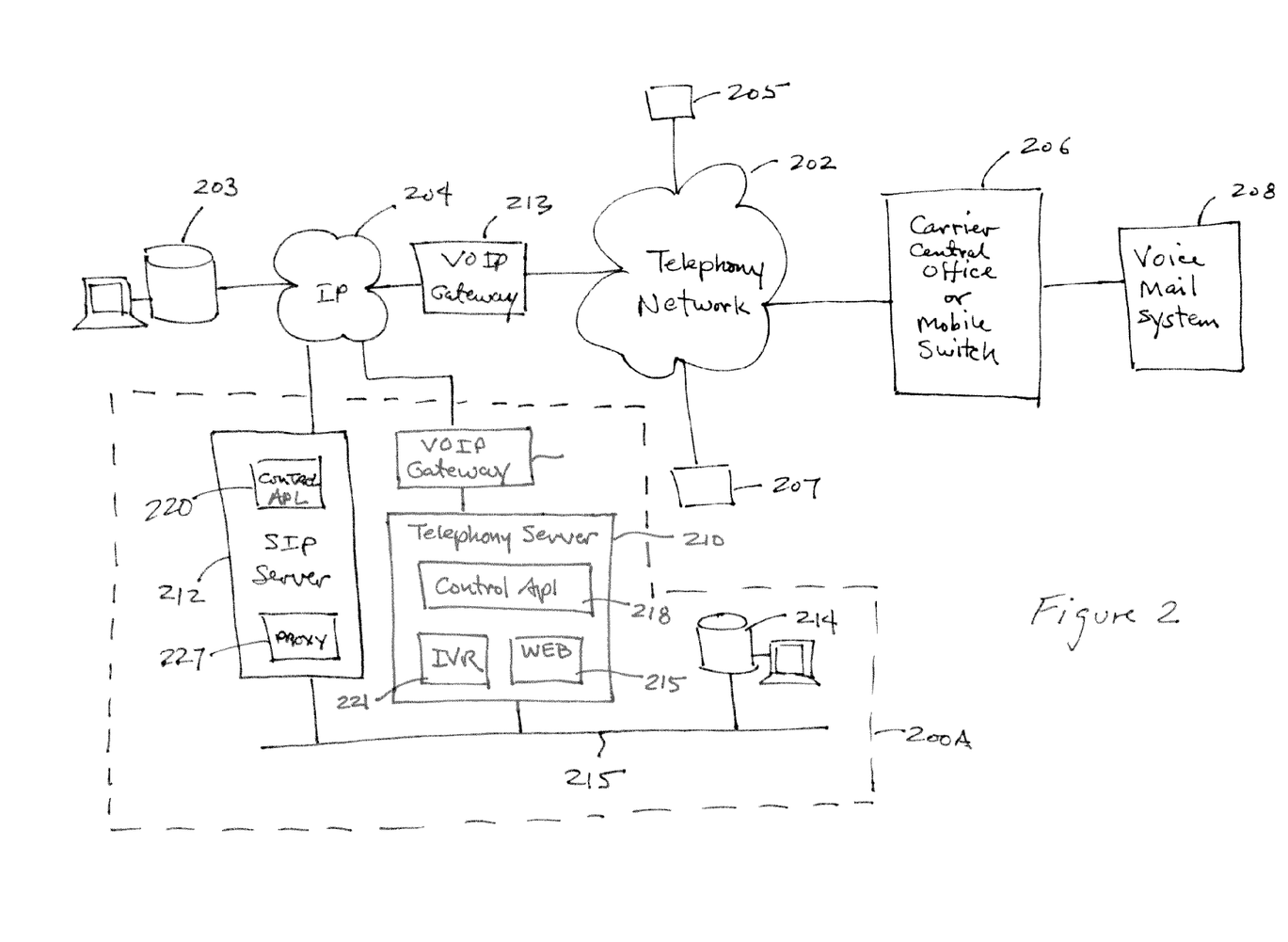
FIG. 2 is a conceptual diagram of a first phone server system and communications environment in accordance with the disclosed system.

FIG. 2 illustrates a first exemplary hybrid communications environment in which the disclosed system 200A and techniques may be implemented. Both telephony server 210 and SIP server 212 of system 200A are coupled via Voice Over Internet Protocol (VOIP) gateway 213 to a hybrid telecommunication environment including one or more local public switched telephone networks (PSTNs), collectively indicated as telephony network 202. Both telephony server 210 and SIP server 212 are also connected to a global packet-switched network 204, for example, an Internet Protocol (IP) based network, such as the Internet. A caller terminating apparatus 205 and callee terminating apparatus 207 may be connected to one or both of PSTN 202 or IP network 204. System 200A is connected via the telephony network 202 to a carrier's central office or mobile switch 206 which, in turn, is connected to the carrier's voice mail facility 208 which serves as the callee/subscriber. In a contemplated environment, the carrier's central office 206 also includes a gateway 223 and SIP server 222, similar to gateway 213 and server 212, respectively, depending on the specific technology of the carrier system. In the illustrative embodiment, gateway 213 may be implemented with any number of commercially available voice over Internet Protocol gateways such as those commercially available from Cisco Systems. Gateway 213 may be coupled by one or more PRI/T1 ports or other types of connectivity to PSTN network 202. In addition, one or more database services 203, such Neustar, Inc., described herein, may be coupled to network 204.

Network 202 may comprise one or more local PSTN networks, some of which may include traditional network elements, such as a central office, PBXs, routers, trunk lines, fiber optic cables, etc. interconnected to one or more terminating apparatus. Further, any of the local PSTN networks within network 202 may be implemented as either an integrated services digital network (ISDN) or a plain old telephone service (POTS) network. In addition, network 202 may include one or more PSTN long distance carrier service providers that function as a long distance toll network over which calls can be routed. The design and function of network 202, including many such long distance toll networks, being known in the art and not described herein in detail.

Terminating apparatus 205 and 207 may be implemented with either a digital or analog PSTN telephone, mobile phone, VoIP phone or any other apparatus capable of receiving a call such as modems, facsimile machines, etc., such apparatus being referred to collectively hereinafter as a terminating apparatus, whether the network actually terminates. In addition such terminating apparatus may be implemented with an Internet telephony process, or cellular telephone, with or without a web access capabilities. As used herein, the term "call destination channel" comprises any of the telephony infrastructure, including circuitry and virtual logic components, associated with a particular callee number, including the carrier provided voice mail facility associated with such callee number.

Phone Server System

In a first illustrative embodiment, system 200A comprises a telephony server 210, Session Internet Protocol (SIP) server 212, gateway 211, and call status database 214 interconnected to each other over a WAN/LAN 215. Although servers 210 and 212 and database 214 are illustrated as connected via a private network, both servers 210 and 212 and database 214 may be located physically anywhere and accessible to each other over a global public network such as the Internet. Alternatively, servers 210 and 212 and database 214 may execute on the same computer architecture. An Ethernet LAN hub (not shown) may interconnect telephony server 210, database 214, gateway 211, and SIP server 212. Both telephony server 210 and SIP server 212 may be implemented with a computer architecture similar to that illustrated in FIG. 1. The implementations of telephony server 210, database 214, and SIP server 212 are described below in greater detail.

Figure 4:
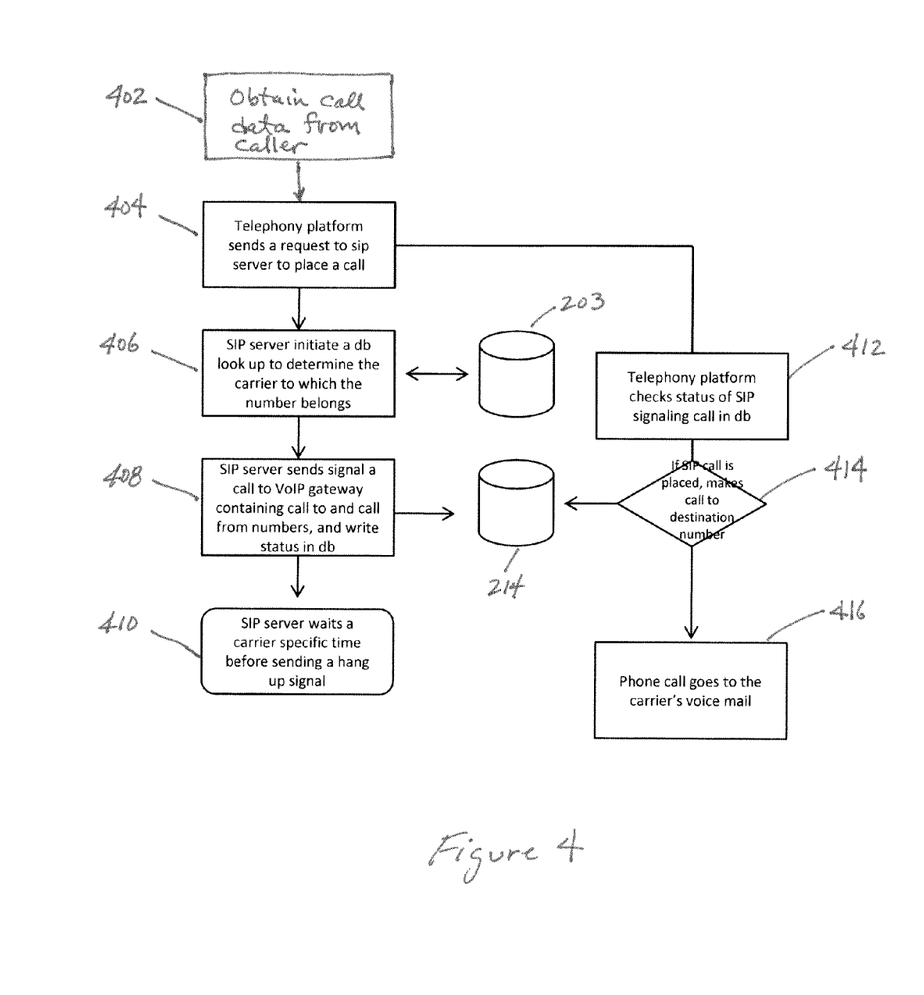
FIG. 4 is a flow chart illustrating the processes performed in accordance with the disclosed system.

In the disclosed system, telephony server 210 functions to receive call information, and establish the actual voice call with the voice mail facility provided by the callee's carrier, as explained in greater teacher with reference to FIG. 4 herein. Such functionality by may be implemented with a control application 218 executing under the control of an operating system. Control application 218 includes the necessary computer code and modules to perform the telephony server 210 processes described with reference to FIG. 4. In addition, server application 218 may perform billing and call record tracking functions, if such service is a paid service. In the illustrative embodiment, Windows NT operating system may be utilized on telephony server 210, although other operating systems also may be used such as Linux or Unix operating systems.

Telephony server 210 further includes an Interactive Voice Response (IVR) module 221 which serves to pass information from caller terminating apparatus 205 to and from telephony server 210. In the illustrative embodiment, IVR module receives data signals from gateway 213 and supplies them through the appropriate APIs to a control module 209 in telephony server 210. The IVR module includes logic to respond to touch-tone commands from a caller. In particular, the IVR module may be configured to translate the Dual Tone Multi-Frequency (DTMF) signal received from a requestor to a machine-readable format, such as ASCII, that is recognizable by database 214. Alternatively, the IVR module may include a word recognition unit that is configured to output digitally recorded words that is converted to ASCII format for delivery to database 214 or telephony server 210. Still further, IVR module may include a processor that executes text-to-speech synthesis programmed instructions designed to use ASCII input, to generate "read aloud" audio prompts of that ASCII input in a machine synthesized voice. The construction, function and implementation of an IVR module suitable for use in the disclosed system including the appropriate device driver and protocol are within the scope of those reasonably skilled in the arts.

In addition, an optional web server application 215 may also be implemented as an executable application running under the control of an operating system. In the illustrative embodiment, the Windows NT operating system may be used, although other operating systems also may be used such as Linux or Unix. Web server application 215 itself may be used implemented with Appache Web Server, along with PHP and Java script programs, or other web application programming languages such as Ruby or Ajax. When the user accesses web server 215, a web page containing one or more dialogue boxes may be used to enter the information of the callee number. When the information is entered, along with any other optional relevant account information, web server 215 connects to the database 214 and transmits to database 214 the account number and the associated phone number.

In the disclosed system, SIP server 212 functions to determine the applicable time delay associated with the identified carrier and to busy the call destination channel to allow the actual call placed by the telephony server 210 to reach the callee's voice mail facility. Such functionality may be implemented with a control application 220 executing under the control of an operating system. Control application 220 includes the necessary computer code and modules to perform the SIP server 212 processes described with reference to FIG. 4. In addition, proxy server application 215 may also be implemented as an executable application running under the control of an operating system. Proxy server application 227 serves to interface with the SIP server at the callee's carrier to establish a signaling only call to the call destination channel, as explained with reference to FIG. 4.

Database 214 and accompanying query server, serves as the central call status database and synchronization mechanism for system 200A, as explained hereafter. Database 214 may be implemented on a computer architecture similar to that illustrated in FIG. 1. In the illustrative embodiment, database 214 is implemented with Oracle database software running on an appropriate Windows operating system or other operating systems such as Unix or Linux. It will be obvious to those skilled in the arts that other operating systems and database software may be equally substituted to implement the disclosed system. For example, database 214 may be implemented in accordance with the ODBM database standard and any number of commercially available search query language (SQL) database search engines, such as those available from MicroSoft Corporation, Redmond, Wash.

Figure 6A:
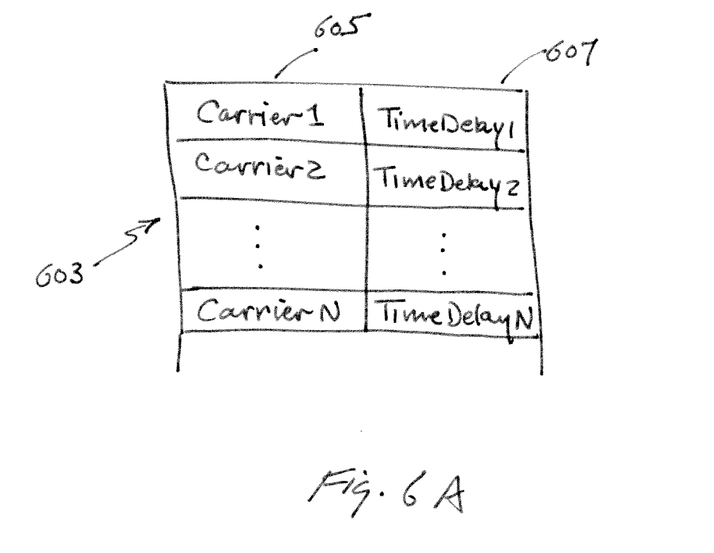
FIGS. 6A-B are conceptual diagrams of a data structures in accordance with the disclosed system.
Figure 6B:
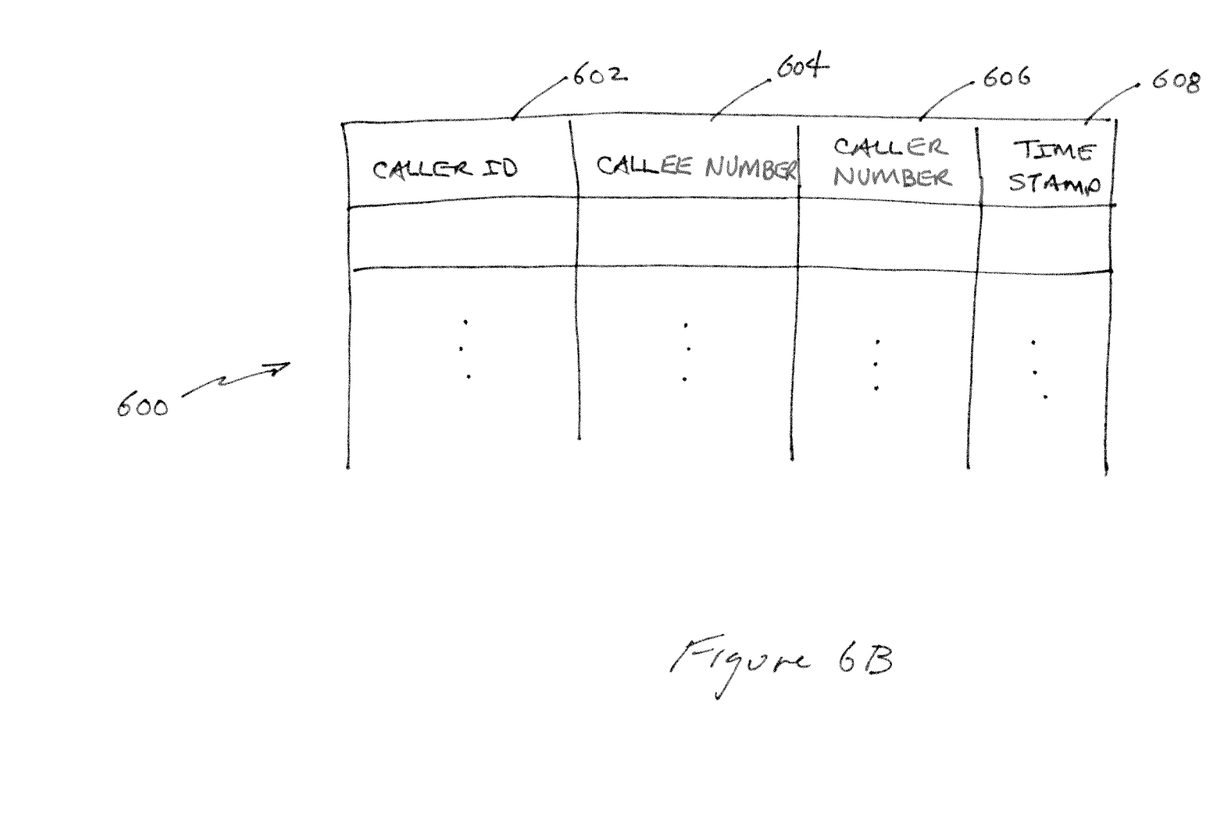

Database 214 may maintain data structures similar to that illustrated FIG. 6A-B. As show in FIG. 6A, structure 603 is used for storing a unique identifier of a carrier (Carrier ID 605) and an empirically derived time delay (Time Delay 607) associated with that carrier. As show in FIG. 6B, structure 600 is used for storing a unique identifier of a call (Call ID 602), the number to be called (Callee Number 604), number called from (Caller Number 606) and a temporal indicator (Time Stamp 608) indicating the time at which the first signaling call was initiated with the call destination channel, as explained hereinafter. Although the disclosed system described herein may be practiced with a single database, it is also contemplated that multiple databases may be used in addition to or in place of database 214. Such plural databases may be arranged in any of a parent/child, distributed, peer-to-peer or other configuration to increase fault tolerance in the system. Specifically, a plurality of databases may be operatively coupled, typically through either a virtual private network or IP network to each other. Such databases may be located at geographically disparate locations. In such configuration, any database can store carrier identifiers and delay times values, or ranges of values. In yet another alternative embodiment, in place of a database and search engine, a plurality of look-up tables may be stored in memory of telephony server 210 for use with look-up algorithms from control application 218.

In the illustrative embodiment, gateway 211 may be implemented similar to gateway 213 described herein.

Calling Process

Referring to FIG. 4, a hybrid flow chart illustrating the processes performed by system 200A in accordance with the disclosure is shown. First, telephone server 210 receives an incoming call from a terminating apparatus 220, which may be a traditional PSTN telephone, an Internet telephony process, or a cellular telephone. Next, the IVR module 221 within the telephony server 210 prompts the caller to enter the telephone number of the callee, using, for example, a prerecorded audio file. The caller then specifies, typically through DTMF signals, or the packetized equivalent thereof, telephone number of the callee for which he/she wishes to leave a voicemail message. These processes are illustrated collectively by process block 402.

Telephony server 210 then sends a request to SIP server 212 to place a call, as illustrated by process block 404. The request includes the Caller Number 606, Callee Number 604, and a Call ID 602 assigned by the telephony server 210.

SIP server 212 then queries database 203 using all or part of Callee Number 604 to determine if the telephone number is valid, and which carrier is responsible for establishing a connection to such number, as illustrated by process block 406. The telephone number data in the query may be in the form of a Dialed Number Identification Service (DNIS) string. DNIS is a service provided by telecommunications companies to corporate clients that lets them determine which telephone number was dialed by a customer. This is useful in determining how to answer an inbound call. The telecommunications company sends a DNIS number to the client phone system during the call setup. The DNIS number is typically 4 to 10 digits in length.

Such process may be performed by accesses either an on-line database service or an internal database to determine the Carrier associated with the telephone number. One such on-line database service suitable for use with the disclosed system is commercially available from Neustar, Inc., Sterling, Va. Neustar is a provider of clearinghouse and directory services to the global communications and Internet industry, including data required to route telephone calls in North America, to exchange information with other communications service providers, and to manage technological changes in their own networks. The Neustar service provides to SIP server 212 and identifier of the carrier to which the value of Callee Number 604 is assigned. The results of the database query normally include the name of the Carrier associated with the telephone number in a format that is usable by SIP server 210 as Carrier ID 605.

Once the carrier associated with the callee number has been identified, SIP server 212 queries database 214 to determine the delay time (Time Delay 607) associated with the identified carrier. In the illustrative embodiment, the values for a time delay or acceptable range of time delays for the various carriers within a region, e.g., the United States, have been empirically determined after testing with multiple time delay values. Since the number of carriers in the United States is relatively small, the data structure 603 in which the time delays are stored in a memory may be implemented with either database 214 or embedded directly within be algorithmic code of control module 220. Time Delay 607 associated with a carrier represents the interval of time that the SIP server 212 must wait following initiation of a signaling call with the call destination channel identified by the Callee ID before the signaling call is terminated by the SIP server 212. Such time delays are chosen to represent the amount of time necessary for the call destination channel to be busied by the signaling call without the callee actually being notified of an incoming call by its respective carrier. As such, the time delay enables a voice call to be routed to a callee's voice mail facility transparently. Such delay times vary by the responsiveness of a carrier network infrastructure. In the illustrated embodiment Time Delay 607 will typically have a value in the range from between 100 milliseconds to 5 seconds, with most carriers needing a range of between 300 milliseconds to 3.5 seconds. If the time delay value is too short, the call destination channel will not be busied long enough for the second call to be routed to the callee's voicemail. If the time delay value is too long, the carrier will notify the callee of the incoming signaling call which, if answered, will contain no audio data according to the illustrative embodiment.

Next, SIP server 212 sends a signal call to VoIP gateway 213 containing Callee Number 604 and Caller Number 606 and the records a value for Time Stamp 608 in the location of data structure 600 associated with the respective Call ID 602, as illustrated by process block 408, indicating the time at which the signaling call was initiated. In the illustrative embodiment, the signaling call does not contain audio data. Thereafter, upon receiving acknowledgment from the carriers SIP server 222, the SIP server 212 waits for a period of time substantially equal to the time delay associated with the identified carrier before sending a hang up signal to the gateway 213, as illustrated by process block 410. Such process may be implemented with a sleep function, e.g. a software timer, in control application 220 to wait for a period equal to the time delay. Substantially simultaneously with sending of a the signal call to VoIP gateway 213, a timer, typically a software implemented up-counter or down-counter algorithm, counts for a period of time equal to the value of Time Delay 607. Upon expiration of such counter process, an interrupt is generated notifying control application 220 to terminate the signaling call.

In the illustrated embodiment, database 214 serves as a synchronization mechanism between telephony server 210 and SIP server 212. The recordation of a value for Time Stamp 608 for a particular Call ID 602 serves as a synchronization mechanism by which telephony server 210 is notified that a signaling call has been placed. Telephony server 210 monitors the status of the Call ID 602 representing the SIP signaling call in database 214, as illustrated by process block, and, if the value for Time Stamp 608 indicates that SIP signaling call has been initiated, telephony server 210 will place a call to the call destination channel identified by the value of the Callee Number 604, as illustrated by the decisional block 414 and process block 416, through gateway 213 and telephony network 202.

As a result of the above technique, the carrier central office or mobile switch 206 receives two calls, a first call comprising signaling data but no audio data, and a second call comprising both signaling data and audio data. The first call routed to the callee's terminating apparatus 207 and then hang up within a period of time which prevents the carrier from notifying the callee's terminating apparatus that a call has been placed to the callee's number. The second call is processed normally and routed to the carrier voice mail system 208, since the carrier central office or mobile switch 206 detects that the callee is already processing a call.

Figure 5:
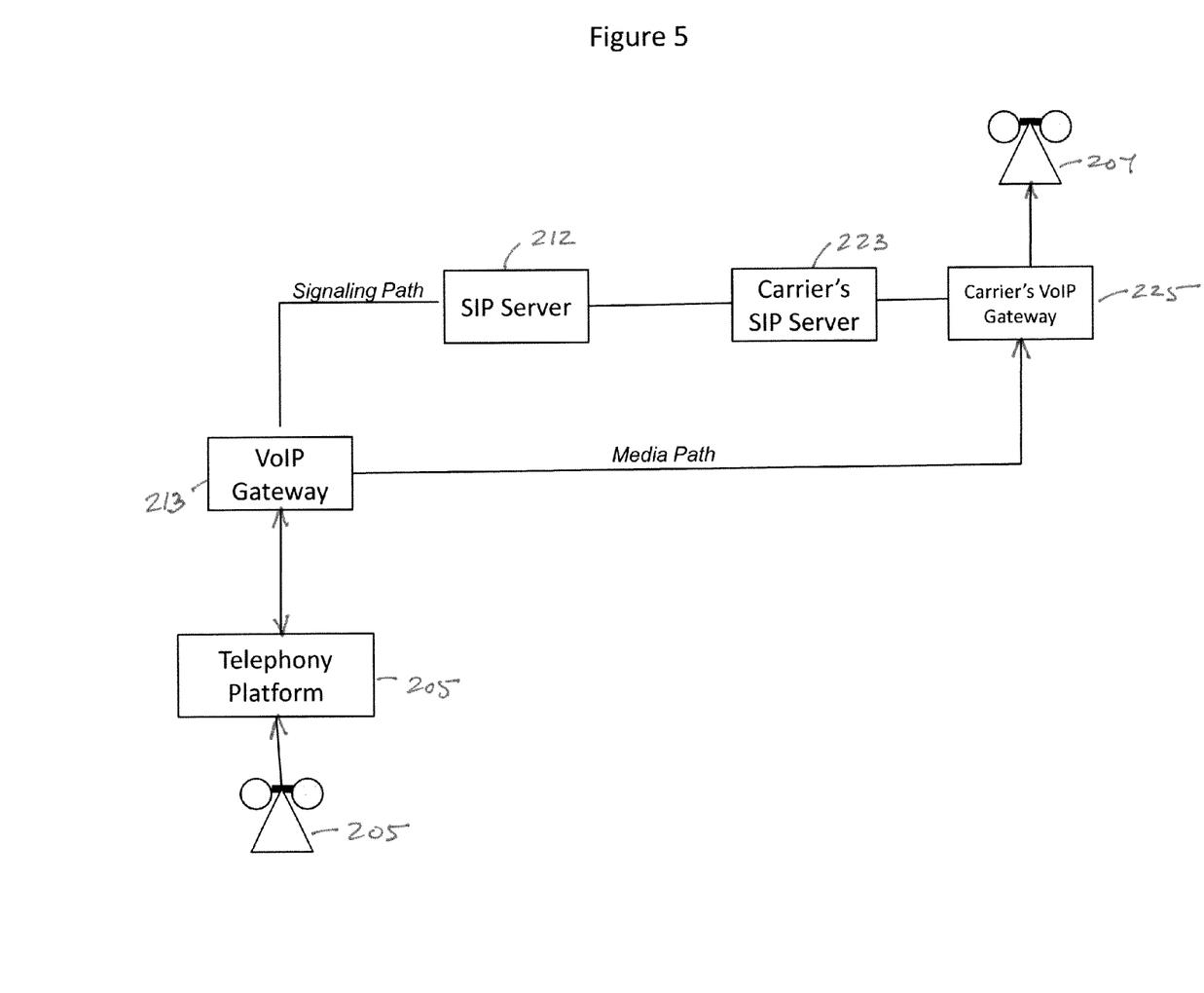
FIG. 5 is a conceptual diagram of the message protocol in accordance with the disclosed system.

Referring to FIG. 5, the exchange of messages within the SIP protocol are illustrated. In the first illustrative embodiment, SIP is used to trigger the signaling call. VoIP using SIP is divided into two parts: first, the singling call set up, and, second, the RTP streaming between the originating and terminating gateways. Control application 220 in SIP server 212 signals the gateway that a call is placed using only the signaling part of SIP. The exchange of messages using the SIP protocol is as follows. A SIP task (sip:user1@here.com) executing on SIP server 212 sends an INVITE message through gateway 213 to carrier SIP proxy server 223, which, in turn, forwards the INVITE message to carrier gateway 225. A reply SIP task (sip:user2@there.com) executing on Carrier SIP server 225 forwards a reply message 200 OK to SIP server 212. The SIP server 212 then forwards an ACK message back to carrier SIP proxy server 223 establishing a final path for the first signaling call in which the caller number and the callee number will be forwarded on to carrier gateway 225. The carrier or terminating network sends back the call status (call progress, call answered, . . . ). Once the call status 200 OK message is received by SIP server 212, meaning the call was successful, the signaling call is hang up or terminated. The Time Delay value after which the call is hang up after receiving 200 OK depends on the terminating carrier. Such duration may be empirically derived through trial and error for each of the terminating carriers. The first SIP call does not contain any RTP streams—meaning actual conversation packets. During the second call initiated by the telephony server 210, the RTP streaming between the originating gateway 213 and the terminating gateway 225 is established to enable transmission of audio data, as illustrated by the media path in FIG. 5.

Various SIP responses codes used for communication between the respective SIP servers are illustrated in Table 1 herein. Such SIP responses complement the SIP Requests, which are used to initiate action such as the phone conversation. Note that the Reason Phrases of the responses listed in Table 1 are only recommended examples, and can be replaced with local equivalents without affecting the protocol.

A commercially available service which implements all or part of the disclosed systems and techniques described herein is offered by Mobilesphere, Inc., Boston, Mass. at http://www.slydial.com on the worldwide web.

Alternative Embodiment

Figure 3:
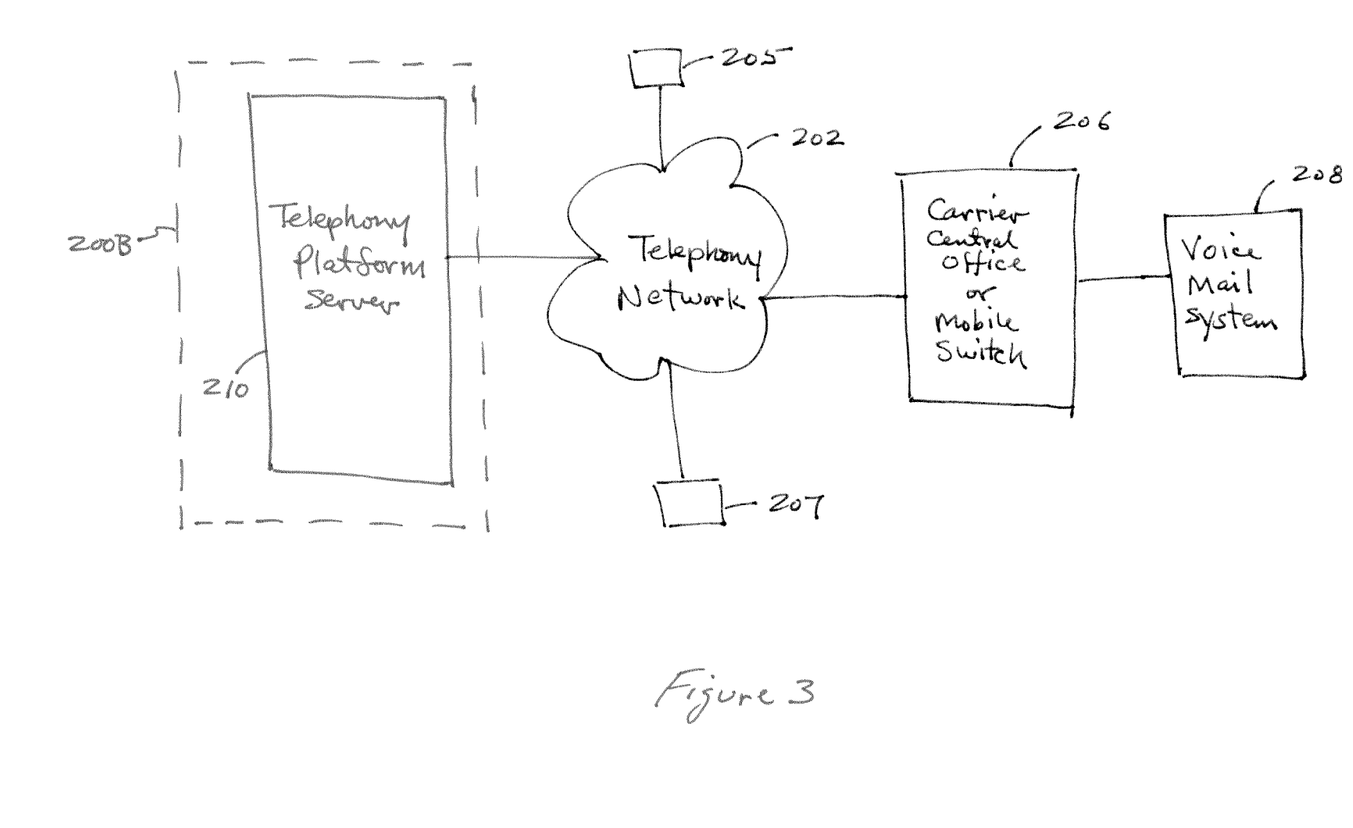
FIG. 3 is a conceptual diagram of a second phone server system and communications environment in accordance with the disclosed system.

FIG. 3 illustrates a second exemplary communications environment in which the disclosed system 200B and techniques may be implemented. In this environment caller terminating apparatus 205, callee terminating apparatus 207, telephony network 202, carrier's central office or mobile switch 206, carrier's voice mail facility 208 and telephony server 210 may have similar structure and function as described with reference to the environment of FIG. 2. Telephony server 210 of system 200B may be coupled to telephony network 202 through one or more T1/E1 digital telephony interface circuit cards, such as those commercially available from Dialogic Corporation of Parsippany, N.J., or by one or more Primary Rate Interchange (PRI)/T1 ports.

In a second disclosed technique utilizing system 200B, the telephony server 210 receives the call data from the caller, as similarly to that previously described with reference to process block 402 of FIG. 4. Thereafter, telephony server 210 places two almost simultaneous calls over telephony network 202 to the callee terminating apparatus 207. The first call busies out the first channel associated with the callee. The second call (the actual voice call) forces the carrier to route the second call to the carrier's voice mail facility 208 associated with the callee since the first signaling call busied the call destination channel.

In such alternative embodiment, the two calls are separated by the period of time necessary for telephony server 210 to confirm that the first call has been established with the call destination channel. Once such confirmation is received telephony server 210 initiates a second call to the call destination channel. Simultaneously, the first call is terminated after a predetermined time interval which may be tracked using a software timer, similar to the previously described embodiment. In such alternative embodiment, the predetermined time may have a value in the range from between 100 milliseconds to 5 seconds with most carriers needing a range of between 300 milliseconds to 3.5 seconds. Values for the predetermined time values may have a format similar to Time Delay 607 and may be stored in a data structure 603 similar to that shown in FIG. 6A as part of look-up table in memory or as part of a database. In system 200B in the described herein or with a traditional PSTN telephony server platform that does not require either a database 214 or SIP server 212, but which interfaces directly with telephony network 202.

TABLE 1

| | Informational Responses (1xx) |
|---|---|
| 100 | Trying (extended search being performed may take a significant time |
| 180 | Ringing |
| 181 | Call Is Being Forwarded |
| 182 | Queued |
| 183 | Session Progress |

| | Successful Responses (2xx) |
|---|---|
| 200 | OK |
| 202 | accepted: It Indicates that the request has been understood but actually can't be processed |

| | Redirection Responses (3xx) |
|---|---|
| 300 | Multiple Choices |
| 301 | Moved Permanently |
| 302 | Moved Temporarily |
| 305 | Use Proxy |

TABLE 1-continued

| | |
|---|---|
| 380 | Alternative Service |
| | Client Failure Responses (4xx) |
| 400 | Bad Request |
| 401 | Unauthorized (Used only by registrars or user agents). |
| 402 | Payment Required (Reserved for future use) |
| 403 | Forbidden |
| 404 | Not Found (User not found) |
| 405 | Method Not Allowed |
| 406 | Not Acceptable |
| 407 | Proxy Authentication Required |
| 408 | Request Timeout (Couldn't find the user in time) |
| 410 | Gone (The user existed once, but is not available here any more.) |
| 412 | Conditional Request Failed |
| 413 | Request Entity Too Large |
| 414 | Request-URI Too Long |
| 415 | Unsupported Media Type |
| 416 | Unsupported URI Scheme |
| 417 | Unknown Resource-Priority |
| 420 | Bad Extension (Bad SIP Protocol Extension used, not understood by the server) |
| 421 | Extension Required |
| 422 | Session Interval Too Small |
| 423 | Interval Too Brief |
| 428 | Use Identity Header |
| 429 | Provide Referrer Identity |
| 433 | Anonymity Disallowed |
| 436 | Bad Identity-Info |
| 437 | Unsupported Certificate |
| 438 | Invalid Identity Header |
| 480 | Temporarily Unavailable |
| 481 | Call/Transaction Does Not Exist |
| 482 | Loop Detected |
| 483 | Too Many Hops |
| 484 | Address Incomplete |
| 485 | Ambiguous |
| 486 | Busy Here |
| 487 | Request Terminated |
| 488 | Not Acceptable Here |
| 489 | Bad Event |
| 491 | Request Pending |
| 493 | Undecipherable (Could not decrypt S/MIME body part) |
| 494 | Security Agreement Required |
| | Server Failure Responses (5xx) |
| 500 | Server Internal Error |
| 501 | Not Implemented: The SIP request method is not implemented here |
| 502 | Bad Gateway |
| 503 | Service Unavailable |
| 504 | Server Time-out |
| 505 | Version Not Supported: The server does not support this version of the SIP protocol |
| 513 | Message Too Large |
| 580 | Precondition Failure |
| | Global Failure Responses (6xx) |
| 600 | Busy Everywhere |
| 603 | Decline |
| 604 | Does Not Exist Anywhere |
| 606 | Not Acceptable |

The above-described system may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be a tangible medium, including but not limited to optical or analog communications lines. The series of computer instructions embodies all or part of the functionality previously described herein with respect to the disclosed system. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments have been disclosed, it will be apparent to those skilled in the art that various changes and modifications can be made which will achieve some of the advantages without departing from the spirit and scope of the disclosed system and techniques. For example, although one of the described embodiments uses the SIP protocol, other VoIP protocols such as H.323 can be used to achieve the same result. Others different messaging clients and protocols may be utilized as well. In addition, numerous programming techniques utilizing various data structures and memory configurations may be utilized to achieve the results of the inventive system described herein. For example, the tables and record structures may be implemented as objects and the described databases may be implemented in different configurations, while still achieving the same results. Further, many of the system components described herein have been described using commercially available products. It will be obvious to those reasonably skilled in the art that other components performing the same functions may be suitably substituted. Further, the disclosed methods may be achieved in either all software implementations, using the appropriate processor instructions, or in hybrid implementations which utilize a combination of hardware logic and software to achieve the same results as well as other modifications to the implementations of the disclosure as are intended to be covered by the any claims deriving priority herefrom.

What is claimed is:

1. A method for communicating directly to a carrier provided voicemail facility associated with a call destination channel comprising:
   A) Initiating a first communication connection with a call destination channel associated with one of a plurality of carriers;
   B) prior to the first communication connection being terminated, simultaneously initiating a second communication connection to the same call destination channel; and
   C) terminating the first communication connection within a predetermined time period following initiation of the first communication connection,
      wherein the predetermined period of time is at least partially determined by which of the plurality of carriers is associated with the call destination channel.

2. The method of claim 1 wherein the first communication connection comprises only signal data.

3. The method of claim 1 wherein the second communication connection comprises signal data and voice data.

4. The method of claim 1 wherein the second communication connection is initiated to the call destination channel within a predetermined period of time after the first communication connection is initiated to the call destination channel.

5. The method of claim 4 wherein the second communication connection is initiated to the call destination channel upon confirmation that the first communication connection has been established with the destination channel.

6. A method for forcing a communication connection with a carrier provided voicemail facility associated with a call destination channel comprising:
   (a) busying with a first communication connection, a call destination channel associated with one of a plurality of carriers without alerting a callee associated therewith;
   (b) prior to the first communication connection being terminated, simultaneously initiating a second communication connection to the same call destination channel; and
   (c) establishing a voice communication connection with the carrier provided voicemail facility associated with the call destination channel.

7. The method of claim 6 wherein (a) further comprises:
   (a1) terminating the first communication connection within a predetermined time period at least partially determined by which of the plurality of carriers is associated with the call destination channel.

8. The method of claim 6 wherein (b) comprises:
   (b1) initiating a second communication connection to the call destination channel within a predetermined time period following initiation of the first indication connection.

9. The method of claim 6 wherein (b) comprises:
   (b1) initiating a second communication connection to the call destination channel upon confirmation that a communication connection has been established with the destination channel.

10. The method of claim 8 wherein the second communication connection comprises signal data and voice data.

11. The method of claim 9 wherein the second communication connection comprises signal data and voice data.

12. The method of claim 6 wherein the first communication connection comprises only signal data.

13. A computer program product for use with a computer system operatively coupled to a communication network, the computer program product comprising a non-transitory computer readable medium having program code embodied thereon comprising:
   (a) program code for initiating a first communication connection to a call destination channel associated with one of a plurality of carriers;
   (b) program code for, prior to the first communication connection being terminated, simultaneously initiating a second communication connection to the same call destination channel; and
   (c) program code for terminating the first communication connection within a predetermined period of time after the first communication connection is initiated to the call destination channel,
   wherein the predetermined period of time is at least partially determined by which of the plurality of carriers is associated with the call destination channel.

14. The computer program product of claim 13 wherein (a) further comprises:
   (a1) program code for receiving an identifier of the call destination channel.

15. The computer program product of claim 14 wherein (a) further comprises:
   (a2) program code for determining from the identifier of the call destination channel, a carrier associated with the destination channel.

16. The computer program product of claim 15 wherein (a) further comprises:
   (a3) program code for determining, from the identified carrier associated with the destination channel, a predetermined time delay associated with the identified carrier.

17. The computer program product of claim 13 wherein the first communication connection comprises only signal data.

18. The computer program product of claim 13 wherein the second communication connection comprises signal data and voice data.

19. The computer program product of claim 13 wherein the second communication connection is initiated to the call destination channel within a predetermined period of time after the first communication connection is initiated to the call destination channel.

20. The computer program product of claim 13 wherein the second communication connection is initiated to the call destination channel upon confirmation that a communication connection has been established with the destination channel.

21. A computer program product for use with a computer system operatively coupled to a communication network, the computer program product comprising a non-transitory computer readable medium having program code embodied thereon comprising:
   (a) program code for busying with a first communication connection, a call destination channel associated with one of a plurality of carriers without alerting a callee associated therewith;
   (b) program code for, prior to the first communication connection be terminated, simultaneously initiating a second communication connection to the same call destination channel; and
   (c) program code for establishing a voice communication connection with the carrier provided voicemail facility associated with the call destination channel.

22. The computer program product of claim 21 wherein (a) further comprises:
   (a1) program code for terminating the first communication connection within a predetermined time period at least partially determined by which of the plurality of carriers is associated with the call destination channel.

23. The computer program product of claim 21 wherein (b) comprises:
   (b1) program code for initiating a second communication connection to the call destination channel within a predetermined time period following initiation of a first communication connection.

24. The computer program product of claim 21 wherein (b) comprises:
   (b1) program code for initiating a second communication connection to the call destination channel upon confirmation that a communication connection has been established with the destination channel.

25. The computer program product of claim 24 wherein the second communication connection comprises signal data and voice data.

26. The computer program product of claim 23 wherein the second communication connection comprises signal data and voice data.

27. The computer program product of claim 24 wherein the first communication connection does not contain voice data.

28. The computer program product of claim 24 wherein the first communication connection comprises only signal data.

29. An apparatus for use with a communications network comprising:
   (a) a processor;

(b) a memory coupled to the processor for maintaining a plurality of carrier identifiers, selected of the carrier identifiers having associated therewith at least one predetermined time delay value, the respective predetermined time delay values not being identical for all carrier identifiers;

(c) a network interface, coupled to the processor and the memory;

(d) program logic, responsive to an identifier of the call destination channel, for determining which of the plurality of carrier identifiers is associated with a call destination channel;

(e) program logic for initiating a first communication connection to the call destination channel;

(f) program logic for, prior to the first communication connection being terminated, simultaneously initiating a second communication connection to the same call destination channel; and (g) program logic for terminating the first communication connection after expiration of a time period at least equal to the predetermined delay value associated with the identified carrier associated with the call destination channel.

30. A method for communicating directly with a carrier provided voicemail facility associated with a call destination channel comprising:

(a) maintaining in a memory a plurality of carrier identifiers, selected of the carrier identifiers having associated therewith at least one predetermined time delay value, the respective predetermined time delay values not being identical for all carrier identifiers;

(b) initiating first and second communication connections, to a call destination channel associated with one of the carrier identifiers; and (c) terminating the first communication connection after expiration of the predetermined time delay value associated with the carrier identifier associated with the call destination channel.

31. The method of claim 30 wherein (b) further comprises:
(b1) receiving an identifier of the call destination channel.

32. The method of claim 31 wherein (b) further comprises:
(b2) determining from the identifier of the call destination channel the carrier associated with the destination channel.

33. The method of claim 32 wherein (b) further comprises:
(b3) determining from the identified carrier associated with the destination channel, a predetermined time delay value.

34. The method of claim 30 wherein the first communication connection comprises only signal data.

35. The method of claim 30 wherein the second communication connection comprises signal data and voice data.

* * * * *

UNITED STATES PATENT AND TRADEMARK OFFICE
CERTIFICATE OF CORRECTION

| | | |
|---|---|---|
| PATENT NO. | : 8,605,869 B1 | Page 1 of 1 |
| APPLICATION NO. | : 12/188821 | |
| DATED | : December 10, 2013 | |
| INVENTOR(S) | : Toufic Boutros Mobarak et al. | |

It is certified that error appears in the above-identified patent and that said Letters Patent is hereby corrected as shown below:

In the Claims

Column 14, line 26 (Claim 21), "(a) program code for busying with a communication" should read -- (a) program code for busying, with a communication --

Signed and Sealed this
Twenty-fifth Day of February, 2014

Michelle K. Lee
*Deputy Director of the United States Patent and Trademark Office*